(12) United States Patent
Tal et al.

(10) Patent No.: US 11,704,053 B1
(45) Date of Patent: Jul. 18, 2023

(54) OPTIMIZATION FOR DIRECT WRITES TO RAID STRIPES

(71) Applicant: Dell Products L.P., Round Rock, TX (US)

(72) Inventors: Doron Tal, Geva Carmel (IL); Yosef Shatsky, Karnei Shomron (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/714,362

(22) Filed: Apr. 6, 2022

(51) Int. Cl.
G06F 3/00 (2006.01)
G06F 3/06 (2006.01)

(52) U.S. Cl.
CPC .......... G06F 3/0655 (2013.01); G06F 3/0604 (2013.01); G06F 3/0689 (2013.01)

(58) Field of Classification Search
CPC ..... G06F 3/0655; G06F 3/0604; G06F 3/0689
See application file for complete search history.

(56) References Cited

U.S. PATENT DOCUMENTS

| | | | |
|---|---|---|---|
| 5,381,539 A | 1/1995 | Yanai et al. | |
| 5,551,003 A | 8/1996 | Mattson et al. | |
| 5,764,880 A | 6/1998 | Gerdt et al. | |
| 6,052,799 A | 4/2000 | Li et al. | |
| 6,941,420 B2 | 9/2005 | Butterworth et al. | |
| 8,843,676 B2 | 9/2014 | Rajamanickam et al. | |
| 8,892,938 B1 * | 11/2014 | Sundaram | G06F 11/2069 714/6.21 |
| 8,949,692 B1 * | 2/2015 | Bonwick | G06F 12/0253 714/766 |
| 9,372,751 B2 | 6/2016 | McNutt | |
| 9,514,014 B2 | 12/2016 | Webman et al. | |
| 9,600,368 B2 * | 3/2017 | Bonwick | G06F 3/0673 |
| 9,892,045 B1 | 2/2018 | Douglis et al. | |

(Continued)

FOREIGN PATENT DOCUMENTS

WO 2015108670 A1 7/2015
WO PCT/US2019/024885 1/2020

(Continued)

OTHER PUBLICATIONS

Dell EMC, "Dell EMC VxRack FLEX," Dell EMC Product Overview, 2018, 5 pages.

(Continued)

*Primary Examiner* — Craig S Goldschmidt
(74) *Attorney, Agent, or Firm* — Ryan, Mason & Lewis, LLP

(57) ABSTRACT

A storage control node receives data to be written to a striped volume, allocates first and second stripes, writes the data to at least one data strip of the first stripe, computes parity data based on the data written to the first stripe, and writes the parity data to the first stripe. The storage control node sends a copy command to a target storage node which comprises the at least one data strip of the first stripe to thereby cause the at least one data strip to be copied to a data strip of the second stripe which resides on the target storage node. The storage control node writes additional data to the second stripe, computes updated parity data based on the additional data and the parity data of the first stripe, writes the updated parity data the second stripe, and releases the first stripe for reuse.

20 Claims, 6 Drawing Sheets

(56) References Cited

U.S. PATENT DOCUMENTS

| | | | |
|---|---|---|---|
| 10,078,598 | B1 | 9/2018 | Wallace et al. |
| 10,331,561 | B1 | 6/2019 | Shilane et al. |
| 10,445,180 | B2 | 10/2019 | Butterworth et al. |
| 10,986,174 | B1 | 4/2021 | Sharma et al. |
| 11,119,668 | B1 | 9/2021 | Keller et al. |
| 11,144,399 | B1 | 10/2021 | Yarimi et al. |
| 11,163,479 | B2 | 11/2021 | Lieblich et al. |
| 11,163,699 | B2 | 11/2021 | Keller et al. |
| 11,221,975 | B2 | 1/2022 | Puder et al. |
| 11,262,933 | B2 | 3/2022 | Matosevich et al. |
| 2002/0032835 | A1 | 3/2002 | Li et al. |
| 2008/0021853 | A1 | 1/2008 | Modha et al. |
| 2008/0040540 | A1* | 2/2008 | Cavallo ............... G06F 11/1435 711/173 |
| 2009/0204761 | A1 | 8/2009 | Caprioli et al. |
| 2009/0276593 | A1 | 11/2009 | Jacobson et al. |
| 2013/0305002 | A1 | 11/2013 | Hallak et al. |
| 2014/0215147 | A1 | 7/2014 | Pan |
| 2014/0215262 | A1 | 7/2014 | Li et al. |
| 2014/0244935 | A1 | 8/2014 | Ezra et al. |
| 2016/0103764 | A1 | 4/2016 | Banerjee et al. |
| 2018/0113640 | A1 | 4/2018 | Fernandez et al. |
| 2018/0267893 | A1 | 9/2018 | Barzik et al. |
| 2018/0300075 | A1 | 10/2018 | Fernandez et al. |
| 2019/0163587 | A1 | 5/2019 | Anna et al. |
| 2019/0227845 | A1 | 7/2019 | Sridhar et al. |
| 2020/0133503 | A1 | 4/2020 | Sun et al. |
| 2021/0279187 | A1 | 9/2021 | Puder et al. |
| 2021/0294505 | A1 | 9/2021 | Keller et al. |
| 2021/0294774 | A1 | 9/2021 | Keller et al. |
| 2021/0294775 | A1 | 9/2021 | Keller et al. |
| 2021/0303160 | A1 | 9/2021 | Lieblich et al. |
| 2021/0303169 | A1 | 9/2021 | Tagar et al. |
| 2021/0303202 | A1 | 9/2021 | Ben Zeev et al. |
| 2021/0303401 | A1 | 9/2021 | Yarimi et al. |
| 2021/0303407 | A1 | 9/2021 | Keller et al. |
| 2021/0303480 | A1 | 9/2021 | Keller et al. |
| 2021/0373796 | A1 | 12/2021 | Matosevich et al. |
| 2022/0004320 | A1 | 1/2022 | Matosevich et al. |
| 2022/0035788 | A1 | 2/2022 | Aharoni et al. |

FOREIGN PATENT DOCUMENTS

| | | |
|---|---|---|
| WO | PCT/US2019/024900 | 1/2020 |
| WO | 2020204880 A1 | 10/2020 |
| WO | 2020204882 A1 | 10/2020 |

OTHER PUBLICATIONS

G. Soundararajan et al., "Dynamic Resource Allocation for Database Servers Running on Virtual Storage," FAST 2009: Proceedings of the 7th conference on File and storage technologies, Feb. 2009, pp. 71-84.

Dell EMC, "EMC ScaleIO Basic Architecture Documentation," Technical White Paper, Mar. 2017, 22 pages.

EMC2, "EMC ScaleIO Design Considerations and Best Practices," Technical White Paper, Jun. 2016, 30 pages.

I. Koltsidas et al., "SoftwAre Log-Structured Array (SALSA)—A Unified Stack for SSDs and SMR Disks," IBM Research Report, Dec. 2, 2015, 13 pages.

S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.

Dell EMC, "Dell EMC VxFlex Family Overview," Technical White Paper, May 2019, 44 pages.

J. Nakano et al., "ReViveI/O: Efficient Handling of I/O in Highly-Available Rollback-Recovery Servers," HPCA, 10.1109/2006. 1598129, pp. 200-211.

Wikipedia, "Raft (Computer Science)," https://en.wikipedia.org/wiki/Raft_(computer_science), Feb. 10, 2020, 4 pages.

Wikipedia, "Paxos (Computer Science)," https://en.wikipedia.org/wiki/Paxos_(computer_science), Dec. 6, 2019, 21 pages.

Wikipedia, "State Machine Replication," https://en.wikipedia.org/wiki/State_machine_replication, Dec. 14, 2019, 9 pages.

Dell Technologies, "Dell EMC PowerFlex: Secure Snapshots," Technical White Paper, Jul. 2020, 17 pages.

Dell Technologies, "Dell EMC PowerFlex: Protected Maintenance Mode," Technical White Paper, Jul. 2020, 20 pages.

Dell Technologies, "Dell EMC PowerFlex: Introduction to Replication," Technical White Paper, Jun. 2020, 34 pages.

Dell Technologies, "Dell EMC PowerFlex: Networking Best Practices and Design Considerations," Best Practices, Jun. 2020, 64 pages.

Dell EMC, "Getting to Know Dell EMC PowerFlex," Version 3.5.x, Rev. 02, Jan. 2021, 66 pages.

U.S. Appl. No. 17/065,754 filed in the name of Dan Aharoni et al. on Oct. 8, 2020, and entitled "Direct Response to IO Request in Storage System with Remote Replication."

U.S. Appl. No. 17/070,288 filed in the name of Anurag Sharma et al. on Oct. 14, 2020, and entitled "Pipeline-Based System for Configuration Checking and Reporting Associated with an Information Processing System."

U.S. Appl. No. 17/070,073 filed in the name of Dan Aharoni et al. on Oct. 14, 2020, and entitled "Direct Response to IO Request in Storage System Having an Intermediary Target Apparatus."

U.S. Appl. No. 17/071,407 filed in the name of John Moran et al. on Oct. 15, 2020, and entitled "Dynamic Remediation Actions in Response to Configuration Checks in an Information Processing System."

U.S. Appl. No. 17/077,105 filed in the name of Yosef Shatsky et al. on Oct. 22, 2020, and entitled "Volume Tiering in Storage Systems."

U.S. Appl. No. 17/106,988 filed in the name of Rivka Matosevich et al. on Nov. 30, 2020, and entitled "Managing Host Connectivity to a Data Storage System."

U.S. Appl. No. 17/123,525 filed in the name of Itay Keller et al. on Dec. 16, 2020, and entitled "Deferred Reclamation of Invalidated Entries Associated with Replication in a Log-Structured Array."

U.S. Appl. No. 17/145,646 filed in the name of Yosef Shatsky et al. on Jan. 11, 2021, and entitled "Redistribution of Processing Groups between Server Nodes Based on Hardware Resource Utilization."

U.S. Appl. No. 17/232,203 filed in the name of Roman Spiegelman on Apr. 16, 2021, and entitled "Object Synchronization of Server Nodes in a Network Computing Environment."

U.S. Appl. No. 17/236,256 filed in the name of Doron Tal et al. on Apr. 21, 2021, and entitled "Recovery from Partial Device Error in Data Storage System."

U.S. Appl. No. 17/306,601 filed in the name of Rivka Matosevich et al. on May 3, 2021, and entitled "Managing Replication Journal in a Distributed Replication System."

U.S. Appl. No. 17/308,166 filed in the name of Adi Bar Shalom et al. on May 5, 2021, and entitled "Journal Barrier Consistency Determination."

U.S. Appl. No. 17/351,733 filed in the name of Yosef Shatsky et al. on Jun. 18, 2021, and entitled "Data Deduplication in a Disaggregated Storage System."

U.S. Appl. No. 17/361,666 filed in the name of Yosef Shatsky et al. on Jun. 29, 2021, and entitled "Tracking Utilization of Data Blocks in a Storage System."

U.S. Appl. No. 17/511,695 filed in the name of Yosef Shatsky et al. on Oct. 27, 2021, and entitled "Write Cache Management."

U.S. Appl. No. 17/511,699 filed in the name of Yosef Shatsky et al. on Oct. 27, 2021, and entitled "Metadata Management in Storage Systems."

U.S. Appl. No. 17/512,890 filed in the name of Yosef Shatsky et al. on Oct. 28, 2021, and entitled "Utilizing Checkpoints for Resiliency of Metadata in Storage Systems."

U.S. Appl. No. 17/569,198 filed in the name of Yosef Shatsky on Jan. 5, 2022, and entitled "Utilizing a Persistent Write Cache as a Redo Log."

U.S. Appl. No. 17/583,365 filed in the name of Doron Tal et al. on Jan. 25, 2022, and entitled "Data Deduplication in a Storage System."

(56) References Cited

OTHER PUBLICATIONS

U.S. Appl. No. 17/583,787 filed in the name of Michal Yarimi et al. on Jan. 25, 2022, and entitled "Intelligent Defragmentation in a Storage System."

* cited by examiner

100

400

OPTIMIZATION FOR DIRECT WRITES TO RAID STRIPES

TECHNICAL FIELD

This disclosure relates generally to data storage management techniques and, more particularly, to techniques for managing writes to striped storage volumes.

BACKGROUND

Distributed storage systems are implemented using a plurality of storage devices (e.g., storage arrays) which can reside on multiple storage nodes that are network connected via a storage fabric. Various techniques are utilized in distributed data storage systems to provide resiliency and error correction to protect stored data in the event of failures of storage devices or storage nodes. For example, such techniques include erasure coding techniques and RAID (Redundant Array of Independent Drives) techniques. In general, RAID is a technology that is utilized to enhance the performance and reliability of data storage. There are various RAID levels which implement different combinations of techniques such as data mirroring, data striping, parity, etc., to provide fault tolerance and allow missing data to be recovered or otherwise reconstructed in the event of a failure of a storage device or storage node.

Many RAID storage systems utilize a dual-stage write mode of operation. In a first stage, data received from a host is written to a protected write cache, and then an acknowledge message is sent to the host. In a second stage, data from the write cache is processed (e.g., compressed) and aggregated to form a full stripe which is then written to an empty RAID stripe. The dual-stage approach has advantages of providing a low latency acknowledge to the host and avoiding costly updates of existing non-empty stripes. The dual-stage approach, however, requires additional resources to write stripes as compared to a single-stage write operation where the data is directly written to a RAID stripe without having to write the data initially to a write cache. The process of writing data to RAID stripes should be implemented in a way that minimizes the impact on storage system performance.

SUMMARY

Exemplary embodiments of the disclosure include techniques for managing writes to a striped storage volume. For example, an exemplary embodiment includes a stripe write process that is performed in a data storage system which comprises a storage control node and a plurality of storage nodes. The storage nodes are configured to implement a striped volume comprising a plurality of stripes having strips that are distributed over the plurality of storage nodes. In performing the stripe write process, the storage control node receives data from a host system to be written to the striped volume and allocates a first stripe and a second stripe in the striped volume. The storage control node writes the received data to at least one data strip of the first stripe, computes parity data based on the data written to the first stripe, and writes the parity data to at least one parity strip of the first stripe. The storage control node sends a copy command to a target storage node of the plurality of storage nodes, which comprises the at least one data strip of the first stripe to which the received data was written, to thereby cause the target storage node to copy the at least one data strip to a data strip of the second stripe which resides on the target storage node. The storage control node writes additional data to the second stripe, computes updated parity data based on the additional data written to the second stripe and the parity data of the first stripe, and writes the updated parity data to at least one parity strip of the second stripe. The storage control node then releases the first stripe for reuse.

Other embodiments of the disclosure include, without limitation, systems and articles of manufacture comprising processor-readable storage media, which are configured to implement garbage collection in a storage system.

DETAILED DESCRIPTION

Exemplary embodiments of the disclosure will now be discussed in further detail with regard to systems and methods for implementing a stripe write control system to manage writes to a striped storage volume. For purposes of illustration, exemplary embodiments will be described herein with reference to exemplary network computing environments, such as distributed storage environments, which implement data processing systems and associated computers, servers, storage devices and other processing devices. It is to be appreciated, however, that these and other embodiments are not restricted to the particular illustrative system and device configurations shown. Accordingly, the term "network computing environment" as used herein is intended to be broadly construed, so as to encompass, for example, processing systems comprising cloud computing and storage systems, as well as other types of processing systems comprising various combinations of physical and virtual processing resources. A network computing environment may therefore comprise, for example, at least one data center or other cloud-based systems that include one or more cloud systems that host multiple tenants which share cloud resources. Numerous different types of enterprise computing and storage systems are also encompassed by the term "network computing environment" as that term is broadly used herein.

Figure 1:
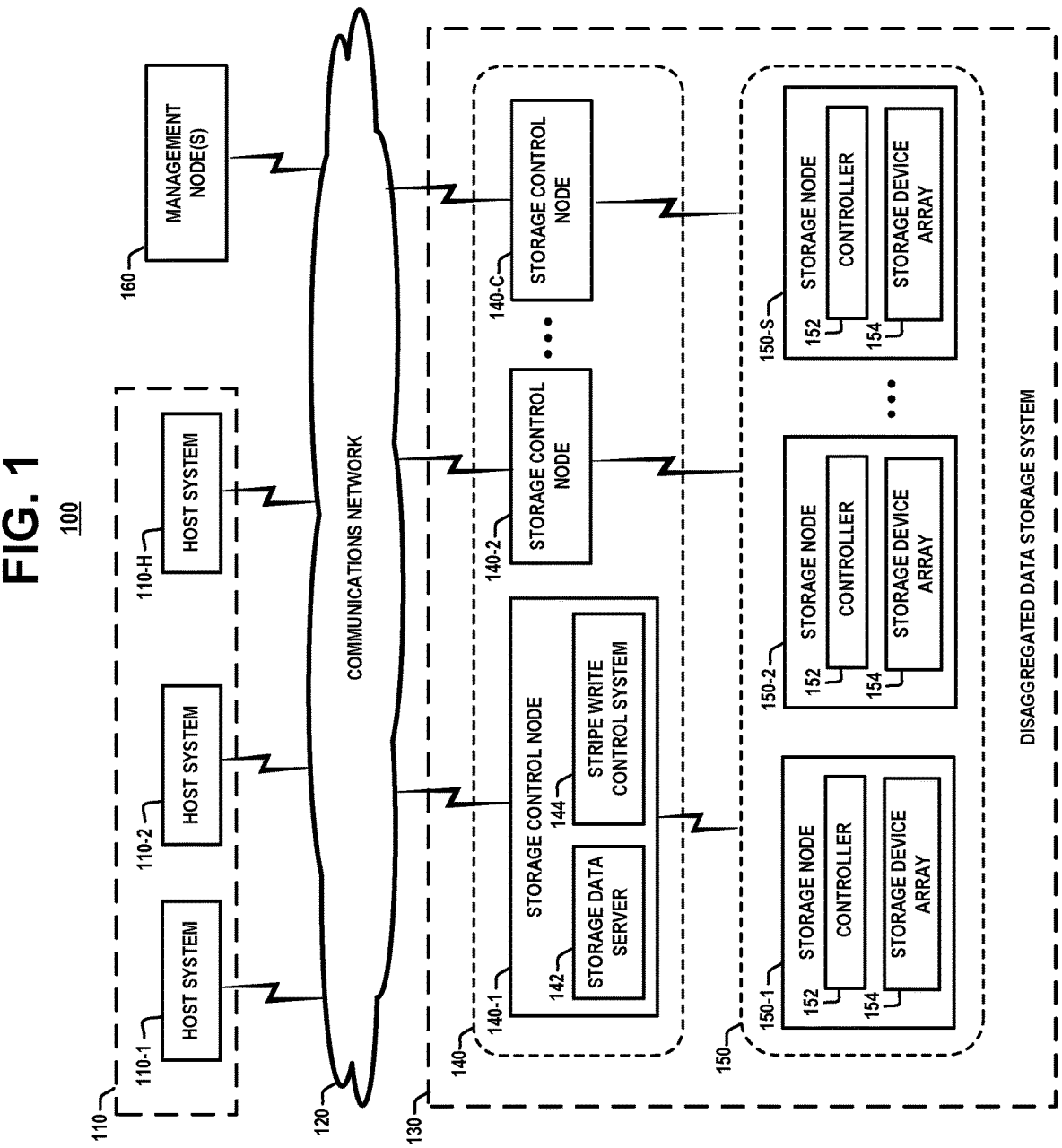
FIG. 1 schematically illustrates a network computing system comprising a storage system which implements a stripe write control system for managing writes to a striped storage volume, according to an exemplary embodiment of the disclosure.

FIG. 1 schematically illustrates a network computing system comprising a storage system which implements a stripe write control system for managing writes to a striped storage volume, according to an exemplary embodiment of the disclosure. In particular, FIG. 1 schematically illustrates a network computing system 100 which comprises one or more host systems 110-1, 110-2, . . . 110-H (collectively, host systems 110), a communications network 120, and a data storage system 130 (e.g., disaggregated data storage system). The data storage system 130 comprises a plurality of storage control nodes 140-1, 140-2, . . . , 140-C (collectively, storage control nodes 140), and a plurality of storage nodes 150-1, 150-2, . . . , 150-S (collectively, storage nodes 150). As shown in FIG. 1, the storage control node 140-1 (or more generally, storage control system) comprises a storage data server 142, and stripe write control system 144. Further, in an exemplary embodiment, the other storage control nodes 140-2 . . . 140-C have the same or similar configuration as the storage control node 140-1 shown in FIG. 1. Each storage node 150-1, 150-2, . . . , 150-S comprises at least one device controller 152, and at least one storage device array 154.

The network computing system 100 further comprises one or more management nodes 160. In general, the management nodes 160 implement application programming interfaces (APIs) to enable manual, automated, and/or semi-automated configuration, management, provisioning, and monitoring of the data storage system 130 and the associated storage control nodes 140 and storage nodes 150. In some embodiments, the management nodes 160 comprise stand-alone dedicated management server nodes, which may comprise physical and/or virtual server nodes.

The host systems 110 comprise physical server nodes and/or virtual server nodes which host and execute applications that are configured to process data and execute tasks/workloads and perform computational work, either individually, or in a distributed manner, to thereby provide compute services to one or more users (the term "user" herein is intended to be broadly construed so as to encompass numerous arrangements of human, hardware, software or firmware entities, as well as combinations of such entities). In some embodiments, the host systems 110 comprise application servers, database servers, etc. The host systems 110 can include virtual nodes such as virtual machines and container systems. In some embodiments, the host systems 110 comprise a cluster of computing nodes of an enterprise computing system, a cloud-based computing system, or other types of computing systems or information processing systems comprising multiple computing nodes associated with respective users. The host systems 110 issue data access requests to the data storage system 130, wherein the data access requests include (i) write requests to store data in one or more of the storage nodes 150 and (ii) read requests to access data that is stored in one or more of the storage nodes 150. The storage control nodes 140 are configured to receive and process the data access requests and store/read data to/from the target storage nodes 150.

The communications network 120 is configured to enable communication between the host systems 110 and the data storage system 130, and between the management nodes 160, and the host systems 110 and the data storage system 130, as well as to enable peer-to-peer communication between the storage control nodes 140 of the data storage system 130. In this regard, while the communications network 120 is generically depicted in FIG. 1, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage network fabric (e.g., Internet Protocol (IP)-based or Fibre Channel storage fabric), or various portions or combinations of these and other types of networks. In this regard, the term "network" as used herein is therefore intended to be broadly construed so as to encompass a wide variety of different network arrangements, including combinations of multiple networks possibly of different types, which enable communication using, e.g., Transfer Control Protocol/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniBand, Gigabit Ethernet, etc., to implement I/O channels and support storage network connectivity. Numerous alternative networking arrangements are possible in a given embodiment, as will be appreciated by those skilled in the art.

The data storage system 130 may comprise any type of data storage system, or a combination of data storage systems, including, but not limited to, a storage area network (SAN) system, dynamic scale-out data storage systems, or other types of distributed data storage systems comprising software-defined storage, clustered or distributed virtual and/or physical infrastructure. The term "data storage system" as used herein should be broadly construed and not viewed as being limited to storage systems of any particular type or types. The storage control nodes 140 and the storage nodes 150 can be physical nodes, virtual nodes, and a combination of physical and virtual nodes.

For example, in some embodiments, each storage control node 140 comprises a server node that is implemented on, e.g., a physical server machine or storage appliance comprising hardware processors, system memory, and other hardware resources that execute software and firmware to implement the various storage control functions and data management functions as discussed herein. More specifically, in some embodiments, each storage control node 140 comprises a plurality of storage control processors which execute a lightweight operating system (e.g., a customized lightweight Linux kernel) and functional software (e.g., software-defined storage software) to implement various functions of the storage control nodes 140 which include, but are not limited to, (i) managing and executing data access requests issued by the host systems 110 for storing/reading data to/from the storage nodes 150, (ii) performing various data management and storage services, and (iii) controlling network communication and connectivity with the host systems 110 and between the storage control nodes 140 within the data storage system 130, etc.

In a distributed storage environment, the storage control nodes 140 are configured to communicate in a cooperative manner to perform functions such as e.g., processing data access requests received from the host systems 110, aggregating/pooling the storage capacity of the storage device arrays 154 of the storage nodes 150, performing functions such as inline data compression/decompression, data deduplication, thin provisioning, and data protection functions such as data replication, snapshot, and data protection and resiliency schemes based on data striping and/or parity (e.g., erasure coding, RAID, etc.), and other types of data management functions, depending on the system configuration.

The storage device arrays 154 comprise one or more of various types of storage devices such as hard-disk drives (HDDs), solid-state drives (SSDs), Flash memory cards, or other types of non-volatile memory (NVM) devices including, but not limited to, non-volatile random-access memory (NVRAM), phase-change RAM (PC-RAM), magnetic RAM (MRAM), etc. In some embodiments, one or more of the storage device arrays 154 comprise flash memory devices such as NAND flash memory, NOR flash memory, etc. The NAND flash memory can include single-level cell (SLC) devices, multi-level cell (MLC) devices, triple-level cell (TLC) devices, or quad-level cell (QLC) devices. These and various combinations of multiple different types of storage devices may be implemented in each storage node 150. In this regard, the term "storage device" as used herein should be broadly construed to encompass all types of persistent storage media including hybrid drives.

On each storage node, the device controller 152 is configured to perform data access operations to read/write data to/from the storage device array 154 in response to data access requests received from a storage control node 140. For example, in some embodiments, the device controller 152 comprises a flash memory controller which manages data stored on flash memory, an SSD controller which manages data stored on SSD device, or other types of device controllers which are configured to manage stored data depending on the type(s) of storage devices that are implemented by the storage device array 154. As explained in further detail below, the device controllers 152 are utilized during an exemplary direct stripe write mode of operation in which an interim stripe is partially written, followed by writing a full destination stripe which comprises, e.g., instructing one or more device controllers 152 to copy and move a corresponding data strip of the interim stripe from one address range to another address range in the respective storage device arrays 154 that are controlled by the device controllers 152.

In some embodiments, the data storage system 130 comprises a disaggregated data storage system in which data processing is separate from data storage. More specifically, the storage control nodes 140 are configured to handle the processing of data associated with data access requests (i.e., I/O read and write requests), and the storage nodes 150 are configured to handle writing/reading data to/from the respective storage device arrays 154. As noted above, the storage control nodes 140 and the storage nodes 150 can be physical nodes, virtual nodes, and a combination of physical and virtual nodes. The disaggregated data storage system 130 is configured to allow each storage control node 140-1, 140-2, ..., 140-C to issue I/O requests directly to any one of the storage nodes 150-1, 150-2, ..., 150-S (e.g., each storage control node 140-1, 140-2, ..., 140-C can directly access data stored on any one of the storage nodes 150-1, 150-2, ..., 150-S). The disaggregated storage system architecture essentially separates the storage control compute layers (e.g., storage control nodes 140) from the data storage layers (e.g., storage nodes 150) which are managed within the same storage network fabric.

The data storage system 130 can be configured using known techniques to implement a disaggregated data storage system. For example, in some embodiments, the storage nodes 150-1, 150-2, ..., 150-S can be external direct-attached storage (DAS) devices, wherein each storage node 150-1, 150-2, ..., 150-S is connected to each storage control node 140-1, 140-2, ..., 140-C using any suitable interface protocol such as Small Computer Systems Interface (SCSI), Fibre Channel (FC), etc. In other embodiments, the storage nodes 150-1, 150-2, ..., 150-S can be network-connected to each of the storage control nodes 140-1, 140-2, ..., 140-C (via a high-performance storage network fabric) using any suitable network configuration and network interface protocol such as Ethernet, FC, Internet Small Computer Systems Interface (iSCSI), InfiniBand, etc. For example, in some embodiments, the storage control nodes 140 and storage nodes 150 are interconnected in a full-mesh network, wherein back-end interconnectivity between the storage control nodes 140 and the storage nodes 150 is achieved using, e.g., a redundant high-speed storage fabric, wherein the storage control nodes 140 can utilize remote procedure calls (RPC) for control messages and remote direct memory access (RDMA) for moving data blocks.

In some embodiments, the storage data servers 142 of the storage control nodes 140 are configured to consolidate the capacity of the storage device arrays 154 (e.g., HDDs, SSDs, PCIe or NVMe flash cards, etc.) of the storage nodes 150 into storage pools from which logical volumes are allocated, wherein the logical volumes (e.g., a block unit of storage management) are identified by, e.g., logical unit numbers (LUNs). More specifically, the storage data servers 142 of the storage control nodes 140 are configured to create and manage storage pools (e.g., virtual pools of block storage) by aggregating storage capacity of the storage device arrays 154 of the storage nodes 150 and dividing a given storage pool into one or more volumes, wherein the volumes are exposed to the host systems 110 as block devices. For example, a virtual block device can correspond to a volume of a storage pool. Each virtual block device comprises any number of actual physical storage devices, wherein each block device is preferably homogenous in terms of the type of storage devices that make up the block device (e.g., a block device can include only HDD devices or SSD devices, etc.).

In some embodiments, each host system 110 comprises a storage data client (SDC) which executes on the host system and which consumes the block storage exposed by the storage data servers 142. In particular, an SDC comprises a lightweight block device driver that is deployed on a given host system 110 to expose shared block volumes to the given host system 110. The SDC exposes the storage volumes as block devices to each application (e.g., virtual machine, container, etc.) that execute on the same server (e.g., host system 110) on which the SDC is installed. The SDC of a given host system 110 exposes block devices representing the virtual storage volumes that are currently mapped to the given host system 110. The SDC for a given host system 110 serves as a block driver for the host system 110, wherein the SDC intercepts I/O requests, and utilizes the intercepted I/O request to access the block storage that is managed by the storage data servers 142. The SDC provides the operating system or hypervisor (which runs the SDC) access to the logical block devices (e.g., volumes). Each SDC has knowledge of which storage data servers 142 hold (e.g., own) its block data, so multipathing can be accomplished natively through the SDCs.

As noted above, the management nodes 160 in FIG. 1 implement a management layer which manages and configures the network computing system 100. In some embodiments, the management nodes 160 comprise a tightly-coupled cluster of manager nodes that are configured to supervise the operations of the storage cluster and manage storage cluster configurations. For example, management nodes 160 include metadata manager (MDM) modules that operate outside of the data path and provide the relevant information to the SDCs and the storage data servers 142 to allow such components to control data path operations. The MDM modules are configured to manage the mapping of SDCs to the storage data servers 142 of the storage control nodes 140. The MDM modules manage various types of metadata that are required to perform various management operations in the storage environment such as, e.g., managing configuration changes, managing the SDCs and storage data servers 142, maintaining and updating device mappings, maintaining management metadata for controlling data protection operations such as snapshots, replication, RAID configurations, etc., managing system capacity including device allocations and/or release of capacity, performing operations for recovering from errors and failures, and system rebuild tasks including rebalancing, etc. For example, in the context of the exemplary embodiments discussed herein, each storage control node 140 is assigned to handle and manage a corresponding set of stripes within a striped storage volume that is configured across the storage device arrays 154 of the storage nodes 150.

The stripe write control systems 144 of the storage control nodes 140 are configured control and manage stripe allocations for stripe write operations, and to selectively perform one of a plurality of different types of stripe write modes of operation depending on the size of I/O writes. In some embodiments, exemplary control schemes will be discussed in the context of a RAID implementation of a storage system, wherein in some embodiments, the storage system comprises data organized in a log-structured array (LSA) architecture. In this regard, in some embodiments, some or all of the storage nodes 150-1, 150-2, . . . , 150-S are configured to implement a striped volume (e.g., RAID array) comprising a plurality of stripes having strips that are distributed over the plurality of storage nodes 150. Further, in some embodiments, the RAID array comprises a log-structured RAID array in which data is written in data strips in a log-structured format. In a log structure format, when stored data is updated, the stored (existing) data is not updated in place, rather, the updated data is written to a new location (out-of-place update) according to a log format, and the corresponding existing data is flagged as being "invalid." In this regard, a log-structured RAID control system is configured to write full stripes, thus avoiding the overhead associated with updating a RAID stripe in place.

Depending on the application, the number of bytes that are written to a data storage for a given I/O write can vary. For example, for certain applications, most of the bytes that are written to the storage system are written as relatively large I/O writes (e.g., larger than 128 KB), while for other applications, data can be written using relatively smaller I/O writes (e.g., much less than 128 KB). In some embodiments, the stripe write control systems 144 are configured to optimize the write path for different ranges of I/O write sizes. For example, in some embodiments, for relatively "small" I/O write sizes, the stripe write control system 144 can select a dual-stage write mode of operation which involves initially writing I/O write data to a write cache. For relatively "large" I/O write sizes, the stripe write control system 144 can select a direct stripe write mode of operation in which the I/O data is written directly to a RAID stripe, without initially being stored in a write buffer or write cache. The direct stripe write operation is advantageous in cases where the I/O write size is similar to or larger than the RAID stripe size. However, a direct stripe write operation is not ideal when the I/O write size is smaller than the RAID stripe size since only a portion of the RAID stripe is written, which then requires garbage collection (GC) soon thereafter to address the low-capacity utilization of the newly written RAID stripe. In such a case, the total amount of consumed resources needed to perform the direct stripe write process and subsequent garbage collection process is similar to the dual-stage write process.

In view of the above, the stripe write control systems 144 are configured to implement an "optimized" direct stripe write operation for "medium-sized" writes which are not large enough to form a full stripe write and warrant the utilization of a standard direct stripe write operation, and which are not small enough to warrant a dual-stage write operation. For example, in performing an "optimized" direct stripe write operation, a storage control node (e.g., storage control node 140-1, FIG. 1) receives data from a host system to be written to a striped volume and allocates a first stripe (referred to herein as "interim stripe") and a second stripe (referred to herein as "destination stripe") in the striped volume. The storage control node writes the received data to at least one data strip of the first stripe, computes parity data based on the data written to the first stripe, and writes the parity data to at least one parity strip of the first stripe. The storage control node sends a copy command to a target storage node of the plurality of storage nodes 150, which comprises the at least one data strip of the first stripe to which the received data was written, to thereby cause the target storage node to copy the at least one data strip to a data strip of the second stripe which resides on the target storage node. The storage control node writes additional data to the second stripe, computes updated parity data based on the additional data written to the second stripe and the parity data of the first stripe, and writes the updated parity data to at least one parity strip of the second stripe. The storage control node then releases the first stripe for reuse.

As explained in further detail below, the process of writing of the second stripe (or destination stripe) essentially provides an optimized garbage collection process which is significantly leaner than performing a full garbage collection operation on a partially written stripe, and is utilized to extend the system capability to optimize incoming writes. Exemplary systems and methods for writing stripes to a striped storage volume according to embodiments of the disclosure will now be discussed in further detail in conjunction with FIGS. 2-6.

Figure 2:
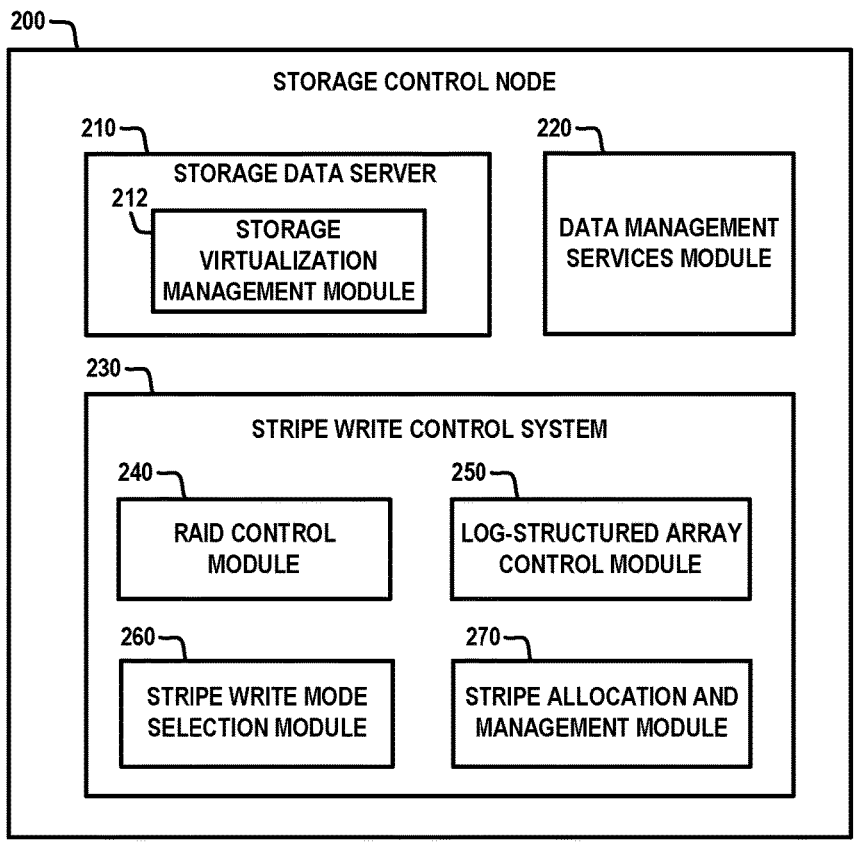
FIG. 2 schematically illustrates a storage control node which implements a stripe write control system for managing writes to a striped storage volume, according to an exemplary embodiment of the disclosure.

FIG. 2 schematically illustrates a storage control node which implements a stripe write control system for managing writes to a striped storage volume, according to an exemplary embodiment of the disclosure. In some embodiments, FIG. 2 schematically illustrates an exemplary architecture of the storage control nodes 140 of the data storage system 130 of FIG. 1. As shown in FIG. 2, the storage control node 200 comprises a storage data server 210, a data management services module 220, and a stripe write control system 230. The storage data server 210 comprises a storage virtualization management module 212. The stripe write control system 230 comprises a RAID control module 240, a log-structured array (LSA) control module 250, a stripe write mode selection module 260, and a stripe allocation and management module 270, the functions of which will be described in further detail below.

The storage data server 210 implements functions as discussed above such as processing I/O write and read requests received from host systems to write/read data to/from target storage nodes 150. The storage virtualization management module 212 implements any suitable logical volume management system which is configured to create and manage local storage volumes by aggregating the capacity of the storage nodes 150 into one or more virtual storage pools that are thin-provisioned for maximum capacity, and logically dividing each storage pool into one or more storage volumes that are exposed as block devices (e.g., LUNs) to the applications or host systems 110 (FIG. 1) which consume the data. The data management services module 220 implements one or more types of data management services including, but not limited to, inline data compression/decompression, data deduplication, data protection functions such as data replication, data backup, data snapshot, and other types of data management functions, depending on the system configuration.

Figure 3:
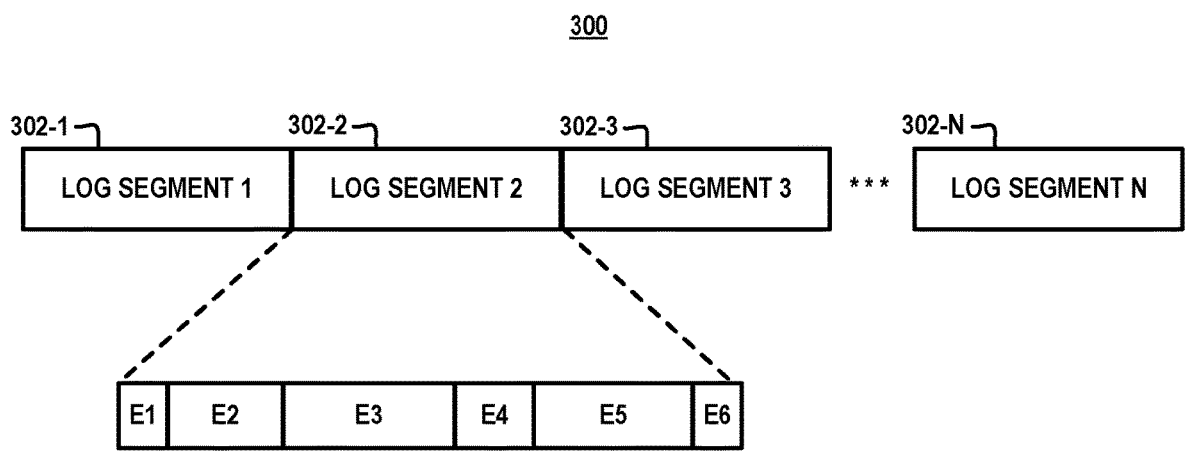
FIG. 3 schematically illustrates a log-structured array which can be generated and managed by the storage control node of FIG. 2, according to an exemplary embodiment of the disclosure.

In some embodiments, the LSA control module 250 is configured to create and manage the log-structured arrays within block storage capacity (e.g., volumes) of storage devices of the storage device arrays 154. More specifically, the LSA control module 250 is configured to organize portions of the block storage capacity of one or more of the storage pools/volumes of the storage devices into a LSA architecture in which data is stored (in compressed form and/or non-compressed form) in log segments of log-structured arrays according to an LSA data placement scheme. For example, FIG. 3 schematically illustrates a log-structured array 300 which can be generated and managed by the storage control node 200 of FIG. 2, according to an exemplary embodiment of the disclosure. The log-structured array 300 comprises an array of N log segments 302-1, 302-2, 302-3, . . . , 302-N (collectively, or individually referred to as log segments 302). In some embodiments, the log-structured array 300 is allocated from block storage capacity of the storage devices. The block storage capacity of each storage device is divided into a plurality of logical data blocks (e.g., fixed-size allocation units), wherein each logical data block comprises a separately addressable unit of the physical storage space with a specified block size (e.g., allocation unit size). Each logical data block (e.g., allocation unit) comprises the same number of one or more physical data blocks of the underlying storage media.

More specifically, as is known in the art, the storage space of a storage device is organized into fixed-size addressable storage units (referred to as allocation units). The "allocation unit size" or "cluster size" of a given storage device is defined by the file system or operating system kernel when formatting the given storage device. An allocation unit represents the smallest logical block size of storage space that can be used to hold data and which is addressed as one logical unit by the operating system. Each logical block has the same "allocation unit size" which corresponds to a specific number of bytes of physical disk space. For example, for SSDs, the smallest addressable storage unit is a "page" wherein common page sizes are, e.g., 2 KB, 4 KB, 8 KB, or 16 KB. The pages of an SSD are aggregated into blocks, e.g., 128 or 256 pages per block. For HDDs, the smallest addressable storage unit is a "logical data block" which is uniquely addressed using a corresponding logical block address (LBA). In HDDs, a logical block size (e.g., 4 KB) can be equal to the physical sector size, or the logical block size can be a multiple of the physical sector size such that each logical block corresponds to a block of physical sectors. For example, for a physical sector size of 512 bytes, a logical block size can be 8×512 bytes=4096 bytes.

In the LSA layout, each log segment 302 of the log-structured array 300 comprises a set of contiguous logical data blocks of the physical block storage space. In some embodiments, as explained in further detail below, the log segments 302 are distributed over multiple storage devices of different storage nodes according to a given RAID implementation, wherein each log segment 302 comprises a data strip of a given RAID stripe. In some embodiments, the log segments 302 are equal in size (e.g., the log segments 302 each include the same number of logical data blocks). For example, the log segments 302 can be, e.g., 32 KB, 64 KB, 128 KB, 256 KB, etc., depending on the application. Assuming that each logical block of a given storage device (e.g., cluster of sectors on HDD, or page of SSD) is 4 KB, and that each log segment 302 has a segment size of 256 KB, then each of the N log segments 302 comprises a consecutive sequence of 64 logical data blocks within the LSA storage space.

Whenever a user-offset is written to a logical block address, the data is placed in a given log segment 302 which has enough vacancy to host the data. For example, when new data is written to the log-structured array 300, the new data is appended to the end of a given log segment 302 which has sufficient space. In addition, metadata comprising log indexing information and other types of metadata are also appended to the given log segment 302 when data is written to the given log segment 302. In this regard, each log segment 302 will include a sequence of appended data entries comprising data items and metadata items. For example, as schematically illustrated in FIG. 3, the log segment 302-2 comprises log entries E1, E2, E3, E4, E5, and E6, wherein in some embodiments, each log entry comprises a data item and an associated metadata item. The log entries E1, E2, E3, E4, E5, and E6 are schematically illustrated in FIG. 3 as having different sizes, which is the result of data compression in an inline compression-enabled data storage system.

The LSA control module 250 implements various methods that are configured to generate and maintain log-structured arrays in block storage. For example, the LSA control module 250 is configured to generate log metadata which is included in metadata items that are appended to associated data items which are stored in the log segments of the log-structured arrays. The log metadata items within the log segment comprise indexing information (e.g., pointers) which is used to provide fast random access to data items within the log segments, as well as information that describes the data items (e.g., valid, not valid, compressed, uncompressed, etc.) within the log segment, and other information such as checksums for error detection, etc. The type of information and data structures that are used to implement the log metadata will vary depending on the application.

Furthermore, in some embodiments, the LSA control module 250 generates and maintains a log-structured array directory which stores mapping information that maps logical block addresses to physical block addresses of log entries within the log-structured arrays. In some embodiments, the directory information of the LSA directory is utilized to determine the location of a given log segment that holds the data of a given logical block, while the metadata indexing entries within the given log segment are utilized to determine the location of corresponding data items within the log segment.

In some embodiments, the LSA control module 250 implements a data placement scheme in which all I/O writes are appended to the end of a given log segment. In this regard, the physical location of data within log segments of the log-structured arrays will change over time as a result of out-of-place writes that are performed by the LSA data placement process, e.g., when writing modified blocks of compressed data to new log entries that are appended to the end of a given log segment. The out-of-place writes result in invalid blocks of data which cannot be reused until they are reclaimed. In addition, deletion operations cause data blocks within a given log segment to become invalid. A garbage collection/defragmentation process is periodically performed to defragment a given log segment (e.g., data strip of a RAID stripe) having invalid log entries, by writing the valid log entries of the given log segment to a new log segment along with additional valid data to fill the new log segment.

The RAID control module 240 implements methods that are configured to distribute, organize, and manage data across multiple storage devices of different storage nodes to implement a RAID array according to a given RAID level configuration (e.g., RAID 5, RAID 6, etc.). The RAID control module 240 implements methods to perform functions such as striping, mirroring, parity computation, etc., to implement a RAID array depending on the given RAID level configuration. More specifically, the RAID control module 240 implements data striping methods that are configured to support RAID schemes which implement data striping techniques to distribute data over a plurality of storage devices. The data striping methods are configured to divide data into resiliency units called "stripes" wherein each stripe comprises a plurality of equal-sized data blocks, referred to as "strips." In some embodiments, the strips of a given stripe are stored on different storage devices of different storage nodes, which are provisioned to implement the RAID array.

In addition, the RAID control module 240 implements parity computing methods that are configured to support parity-based RAID schemes. The parity computing methods are configured to compute parity data using one or more types of parity functions (e.g., eXclusive OR (XOR) function, etc.). The types of parity functions that are implemented will depend on the RAID level configurations that are supported by the RAID control module 240. The RAID control module 240 implements methods for rebuilding of spare capacity in the event of one or more failures of a given RAID array, (e.g., failure of a storage device within the given RAID array, or failure of a given storage node having a storage device that is implemented in the given RAID array, etc.).

In some embodiments, the RAID control module 240 is configured to implement different types of RAID levels (e.g., RAID 5, RAID 6, etc.) which utilize a combination of block level data striping and distributed parity techniques to provide resiliency and error correction in the event of a failure (e.g., failure of a given storage device within a RAID array, the failure of a storage system node which hosts a storage device within the RAID array, etc.). In accordance with exemplary embodiments of the disclosure, the RAID control module 240 generates and manages one or more striped storage volumes (or striped logical volumes) that are associated with RAID configurations. It is to be understood that the term "stripe" as used herein refers to suitable type of storage unit, including, but not limited to, RAID stripes. In this regard, although exemplary embodiments are discussed herein in the context of RAID arrays and RAID stripes, it should be understood that the exemplary embodiments for defragmenting striped logical storage volumes is not limited to any specific type of storage technology.

Figure 4:
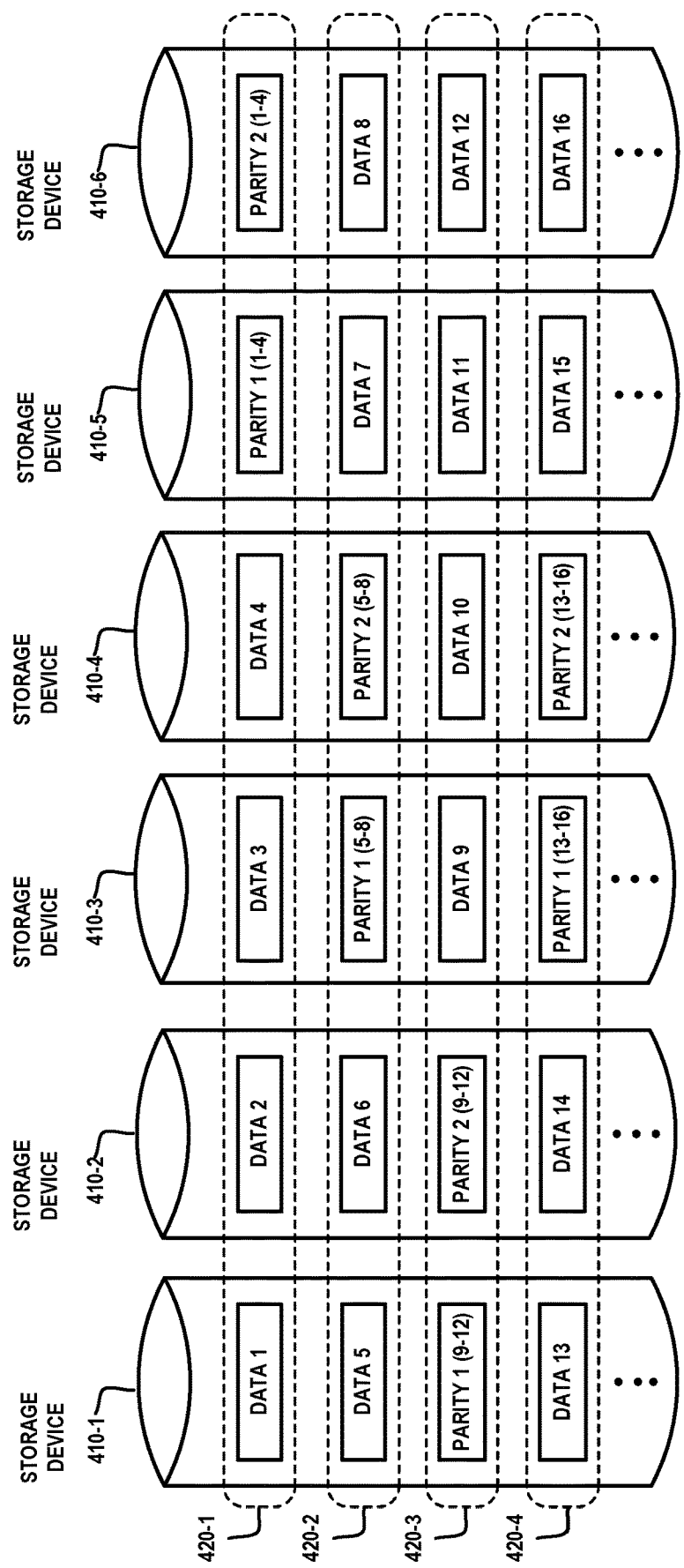
FIG. 4 schematically illustrates a RAID 6 configuration which can be generated and managed by the storage control node of FIG. 2, according to an exemplary embodiment of the disclosure.

FIG. 4 schematically illustrates a RAID 6 configuration which can be generated and managed by RAID control module 240 of the storage control node of FIG. 2, according to an exemplary embodiment of the disclosure. In particular, as shown in FIG. 4, the RAID 6 configuration 400 comprises six storage devices 410-1, 410-2, 410-3, 410-4, 410-5, and 410-6 (collectively, storage devices 410). In some embodiments, in the context of the exemplary system shown in FIG. 1, each storage device 410-1, 410-2, 410-3, 410-4, 410-5, and 410-6 comprises a different storage device (e.g., SSD device) that resides on a different one of the storage nodes 150 of the data storage system 130. The RAID 6 configuration 400 is organized in grids of data blocks, with N rows and K columns, wherein each column is a separate physical storage device (e.g., SSD device) of a different storage node, and wherein 4 data columns are used to store data strips, and two columns are used to store associated parity data strips, e.g., PQ parity data, which is computed using known techniques.

In the exemplary embodiment of FIG. 4, for ease of illustration, four individual RAID stripes 420-1, 420-2, 420-3, and 420-4 are shown, wherein each RAID stripe 420-1, 420-2, 420-3, and 420-4 comprises 4 data strips and 2 parity strips. In particular, the RAID stripe 420-1 comprises four data strips Data 1, Data 2, Data 3, and Data 4, and two independent parity strips Parity 1 (1-4) and Parity 2 (1-4) for the data strips Data 1, Data 2, Data 3, and Data 4. The RAID stripe 420-2 comprises four data strips Data 5, Data 6, Data 7, and Data 8, and two independent parity strips Parity 1 (5-8) and Parity 2 (5-8) for the data strips Data 5, Data 6, Data 7, and Data 8. The RAID stripe 420-3 comprises four data strips Data 9, Data 10, Data 11, and Data 12, and two independent parity strips Parity 1 (9-12) and Parity 2 (9-12) for the data strips Data 9, Data 10, Data 11, and Data 12. The RAID stripe 420-4 comprises four data strips Data 13, Data 14, Data 15, and Data 16, and two independent parity strips Parity 1 (13-16) and Parity 2 (13-16) for the data strips Data 13, Data 14, Data 15, and Data 16.

While FIG. 4 illustrates an exemplary RAID 6 layout for the data strips and associated parity strips, different RAID 6 layout schemes can be implemented which specify different orders and locations in which the constituent data strips and associated parity strips are written to the storage devices 410-1, 410-2, 410-3, 410-4, 410-5, and 410-6 within the RAID 6 configuration 400. The RAID 6 configuration 400 provides resiliency and data protection in the event of a failure of a maximum of two storage devices of the storage devices 410-1, 410-2, 410-3, 410-4, 410-5, and 410-6 which implement the RAID 6 configuration 400.

In some embodiments, in the context of the LSA storage system in which the data is stored in log segments of a log-structured array, each log segment comprises a strip of a given RAID stripe. More specifically, in some embodiments, each log segment comprises a data strip of a given stripe, wherein the stripe includes a plurality of log segments. For example, in some embodiments, each stripe comprises n log segments (data strips) (e.g., n=4), and at least one parity strip which comprises parity data that is generated based on the data of the log segments (data strips) of the stripe. For example, in some embodiments, the parity data for a given stripe is computed using an XOR function, wherein a given parity strip is computed by XORing the data of the log segments (data strips) of the given stripe. For example, in the exemplary RAID 6 configuration shown in FIG. 4, for a log-structured RAID array, the RAID stripe 420-1 comprises four log segments (e.g., data strips Data 1, Data 2, Data 3, and Data 4), and two independent parity strips Parity 1 (1-4) and Parity 2 (1-4) that are computed using the data of the four log segments. In this regard, a group of n log segments can be considered a "resiliency unit" wherein each resiliency unit comprises, e.g., one parity segment (for RAID 5), or two parity segments (for RAID 6), etc.

Referring back to FIG. 2, the stripe write mode selection module 260 is configured to select one of a plurality of different types of stripe write operations for writing I/O data to a stripe depending on the size of the I/O write. In particular, the stripe write mode selection module 260 selects one of a plurality of stripe write operating modes which is optimal for a given I/O write operation. In some embodiments, the stripe write modes include, but are not limited to, (i) a dual-stage write mode, (ii) a direct stripe write mode, and (iii) an optimized direct stripe write mode. The stripe allocation and management module 270 is configured to allocate stripes for writing I/O data, depending on the given stripe write mode. In some embodiments, the stripe allocation and management module 270 maintains a stripe mapping table which provides information regarding the location of allocated stripes (e.g., data strips and parity strips) in blocks of physical storage, as well as other relevant information which his utilized to allocate and management stripes in a striped storage volume.

In some embodiments, for relatively small I/O writes, the stripe write mode selection module 260 will select a dual-stage write mode of operation for writing the I/O data to a stripe. In a first stage, the I/O data received from a host is written to a write cache (e.g., persistent write cache), and then an acknowledge message is sent to the host. In a second stage, the data from the write cache is processed (e.g., compressed) and aggregated to form a full stripe which is written to an empty RAID stripe. The second stage is performed when enough I/O write data is accumulated in the write cache to write a full stripe. In some embodiments, each small I/O write to the write cache is compressed and processed to generate a log entry, and the log entries corresponding to the I/O writes are sequentially appended to log segments which form the data strips of the stripe. One or more parity strips are written to the stripe, which includes parity data generated based on the data of the data strips.

Furthermore, in some embodiments, for relatively large I/O writes, the stripe write mode selection module 260 will select a direct stripe write mode of operation for writing the I/O data to a stripe. In particular, with a direct stripe write mode, the I/O data and associated parity data is written directly to a RAID stripe without storing the I/O data in the write cache or a write buffer. In some embodiments the direct stripe write mode is selected when, e.g., the I/O write size is the same or similar to the total size of the data strips of the stripe. For example, in an exemplary embodiment where a stripe has four (4) data strips, and a strip size of 64 KB, a I/O write having a size of approximately 256 KB (e.g., after being compressed) will be written directly to a newly allocated stripe, along with one or more associated party strips.

Figure 5:
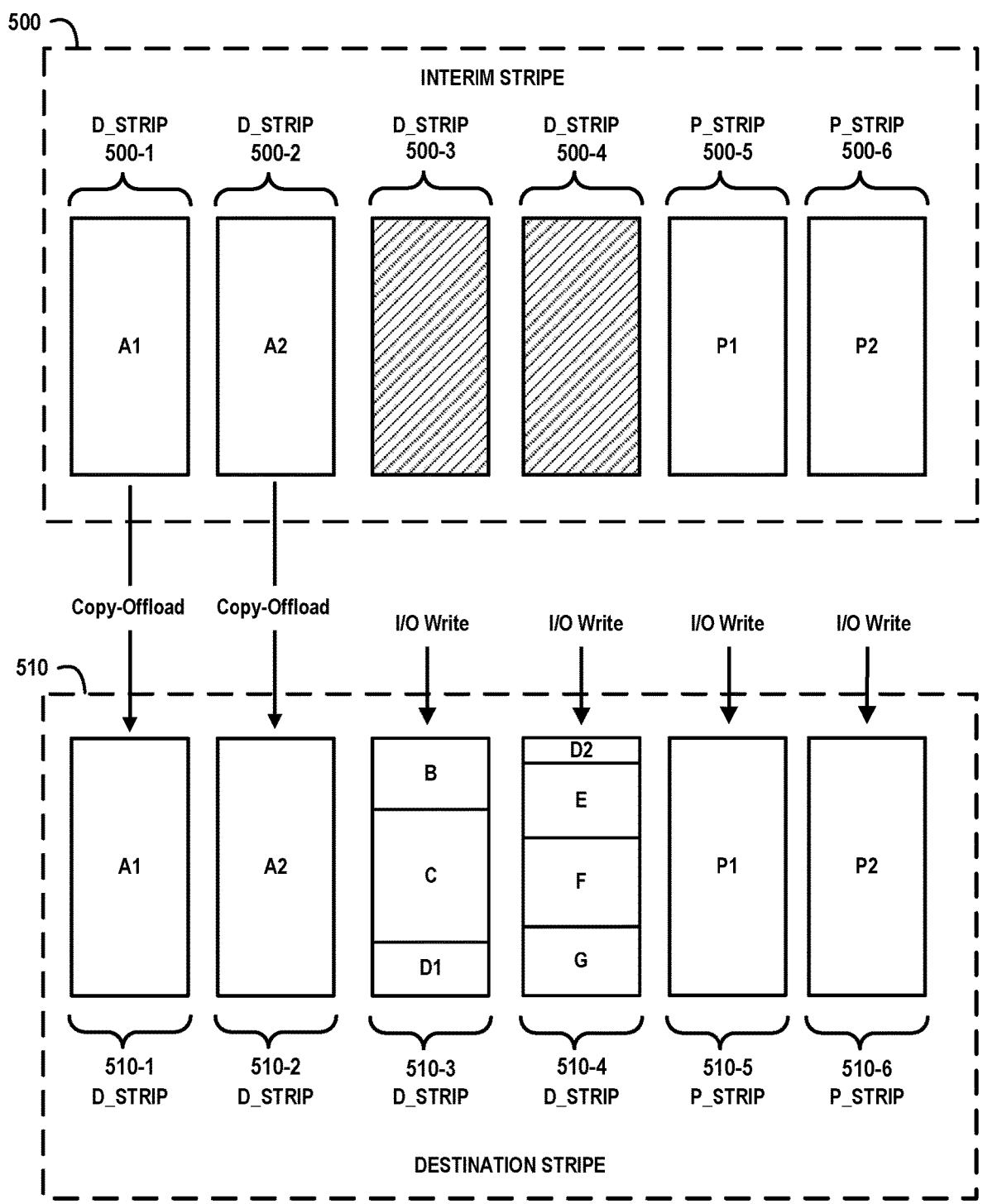
FIG. 5 schematically illustrates a method for writing stripes to a striped storage volume, according to an exemplary embodiment of the disclosure.

Furthermore, in some embodiments, for medium size I/O writes, the stripe write mode selection module 260 will select an "optimized" direct stripe write mode of operation for writing the I/O data to a stripe. In particular, an "optimized" direct stripe write mode is selected when the size of a given I/O write is less than the total size of the data strips of the stripe (e.g., 50% of total size of data strips) but not small enough to warrant a dual-stage write mode. FIG. 5 schematically illustrates a method for writing a stripe to a striped storage volume using an optimized direct stripe write mode, according to an exemplary embodiment of the disclosure.

In particular, FIG. 5 schematically illustrates an "optimized" direct stripe write mode that is implemented using an interim stripe 500 (first stripe) and a destination stripe 510 (second stripe). For purposes of illustration, it is assumed that the "optimized" direct stripe write mode is performed in the context of a RAID 6 storage system, in which the RAID stripes comprise four (4) data strips (D_Strips), and two (2) parity strips (P_Strips). For example, as shown in FIG. 5, the interim stripe 500 comprises six (6) strips 500-1, 500-2, 500-3, 500-4, 500-5, and 500-6 (alternatively referred to as "interim strips"), wherein the strips 500-1, 500-2, 500-3, and 500-4 comprises data strips, and the strips 500-5 and 500-6 comprises first and second parity strips P1 and P2. Similarly, the destination stripe 510 comprises six (6) strips 510-1, 510-2, 510-3, 510-4, 510-5, and 510-6 (alternatively referred to as "destination strips"), wherein the strips 510-1, 510-2, 510-3, and 510-4 comprises data strips, and the strips 510-5 and 510-6 comprises first and second parity strips P1 and P2.

In this exemplary illustration, it assumed that each interim strip 500-1, 500-2, 500-3, 500-4, 500-5, and 500-6 of the interim stripe 500 resides on an independent system component (e.g., different storage devices of different storage nodes), and that each destination strip 510-1, 510-2, 510-3, 510-4, 510-5, and 510-6 of the destination stripe 510 resides on an independent system component (e.g., different storage devices of different storage nodes). Moreover, in some embodiments, the destination stripe 510 is aligned to the same storage devices as the interim stripe 500, i.e., the destination strips 510-1, 510-2, 510-3, 510-4, 510-5 and 510-6 of the destination stripe 510 reside on the same storage devices as the respective interim strips 500-1, 500-2, 500-3, 500-4, 500-5 and 500-6 of the interim stripe 500. In other embodiments, the same strip-to-device allocation between the interim and destination stripes 500 and 510 is only implemented for data strips (e.g., interim data strips 500-1 and 500-2) of the interim stripe 500 which comprise data that was initially stored to the interim stripe 500, and which is copied to the corresponding destination stripes (e.g., destination data strips 510-1 and 510-2) on the same storage devices.

In the exemplary "optimized" direct stripe write mode operation shown in FIG. 5, it is assumed that a given I/O write is received which has a given write size that falls within a given threshold range of write sizes which triggers the "optimized" direct stripe write mode of operation. For example, the I/O write data has a size (e.g., compressed size) that is approximately equal to the size of two data strips of a given strip (e.g., 128 KB). The storage control node will allocate two stripes including the interim stripe 500 and the destination stripe 510. The interim stripe 500 comprises a temporary stripe or a provisional stripe to which the received I/O write data is initially written, wherein the destination stripe 510 is a final stripe to which the received I/O write data will be eventually written to, along with additional data to fill the remaining capacity of data strips of the destination stripe 510.

As shown in FIG. 5, it is assumed that the received I/O data is represented by a data block A which is initially stored in the first and second data strips 500-1 and 500-2 of the interim stripe 500. The data block A is comprised of a first portion A1 which is stored in the first data strip 500-1, and a second portion A2 which is stored in the second data strip 500-2. In this instance, the data block A is stored across the boundary of the first and second data strips 500-1 and 500-2 of the interim stripe 500. The data block A consumes a portion (e.g., two strips) of the interim stripe 500, and unused portions of the data strips of the interim stripe 500 are represented by hatch shaded regions. In particular, as shown in FIG. 5, the third and fourth data strips 500-3 and 500-4 of the interim stripe 500 are not used to store the data block A associated with the I/O write data. In some embodiments, the unused portions (hatched shaded regions) of the data strips are zero filled using, e.g., a zero write optimization command, to fill the unused portions the data strips of the interim stripe 500 with logic zeros. The parity strips 500-5 and 500-6 of the interim stripe 500 comprise parity data that is computed using the data of the interim data strips 500-1, 500-2, 500-3, and 500-4, which computation is facilitated by the zero filling unused portions of the data strips of the interim stripe 500.

At a given point in time, a "garbage collection process" is performed on the interim stripe 500 which involves (i) copying the data strips 500-1 and 500-2 of the interim stripe 500 to the respective data strips 510-1 and 510-2 of the destination stripe 510, (ii) writing additional data to remaining portions (e.g., data strips 510-3 and 510-4) of the destination stripe 510, and (iii) computing and writing updated parity information to the parity strips 510-5 and 510-6 of the destination stripe 510. In some embodiments, the interim data strips 500-1 and 500-2 are written to the destination stripe 510 by a process which includes copying the interim data strips 500-1 and 500-2 of the interim stripe 500 to the corresponding data strips 510-1 and 510-2 of the destination stripe 510 using copy-offload commands, as schematically illustrated in FIG. 5.

More specifically, in some embodiments, the interim data strip 500-1 is written "as is" to the destination strip 510-1 (which resides on the same storage device) using a local copy command (e.g., xCopy (for SCSI), "simple copy" (for NVMe), etc.) that is executed by the local device controller of the storage node. Similarly, the interim data strip 500-2 is written "as is" to the destination strip 510-2 (which resides on the same storage device) using a local copy command that is executed by the local device controller of the storage node. Since the interim data strip 500-1 resides on the same storage device/node as the destination data strip 510-1, and since the interim data strip 500-2 resides on the same storage device/node as the destination data strip 510-2, the process of writing to the destination data strips 510-1 and 510-2 involves a local copy operation, which eliminates the need to perform I/O writes over a storage network (and thus reduces the storage network traffic) to write portions of the destination stripe 510.

Furthermore, FIG. 5 schematically illustrates that I/O write operations are performed to write additional data to the data strips 510-3 and 510-4 of the destination stripe 510 to fill the destination stripe 510, and well as write updated parity information to the parity strips 510-5 and 510-6 of the destination stripe 510. More specifically, FIG. 5 illustrates that additional data blocks B, C, D (comprised of D1 and D2), E, F, and G are written to the data strips 510-3 and 510-4 of the destination stripe 510 to fully populate the destination stripe 510. The additional data blocks can be data blocks that are destaged from a write cache (e.g., as part of a dual-stage write operation), valid data blocks obtained from one or more victim stripes that are undergoing garbage collection and stripe defragmentation, etc. Each data block A (comprised of A1 and A2), B, C, D (comprised of D1 and D2), E, F, and G represents an atomic unit of data (e.g., log entry) that will be valid or invalid as a whole. In embodiments where in-line data compression is implemented to compress data blocks before storing such data blocks in log segments/data strips, the data blocks will have different sizes, as schematically shown in FIG. 5. Furthermore, in some embodiments, a given data block may cross a data strip boundary and be stored in consecutive strips. For example, as shown in FIG. 5, the additional data block D is comprised of a first portion D1 which is stored at the end of the third data strip 510-1, and a second portion D2 which is stored at a beginning of the fourth data strip 510-4. In this regard, the data block D is stored across the boundary of the third and fourth data strips 510-3 and 510-4 of the destination stripe 510. An optimized direct stripe write operation will be explained in further detail below in conjunction with the exemplary process flow of FIG. 6.

As noted above, the stripe write mode selection module 260 is configured to select one of a plurality of stripe write modes for writing I/O data to a stripe depending on the size of the I/O write, wherein such stripe write modes include, but are not limited to, (i) a dual-stage write mode, (ii) a direct stripe write mode, and (iii) an "optimized" direct stripe write mode. It is to be understood that the term "optimized" as used herein in conjunction with a direct stripe write mode refers to a process of performing a direct stripe write operation which allocates and utilizes an interim stripe and destination stripe. The term "optimized" or "optimization" as used herein should not be construed as being limited to any particular absolute maximum or minimum I/O or storage system performance.

The stripe write mode selection module 260, however, is configured to select among a plurality of different stripe write modes of operation based on various factors and conditions that favor performing an optimized direct stripe write operation, over a dual-stage write operation, or a standard direct stripe write operation. For example, in some embodiments, there is specified range of I/O write sizes in which the optimized direct stripe write operation is deemed to provide better overall storage system performance as compared to a dual-stage write operation, or a standard direct stripe write operation.

For example, assume that n denotes a stripe width (i.e., total number of data and parity strips), k denotes the number of data strips of the stripe, s denotes a write size (in terms of number of strips) wherein s can be an integer (e.g., 1, 2, etc.) or a rational number (e.g., 0.5, 1.25, etc.), n−k denotes a fixed protection overhead (which is relevant when a partial stripe is written), n/k denotes a proportional protection overhead (which is relevant when a partial stripe is written), and v denotes an amount of valid data in a given stripe.

In some embodiments, the stripe write mode selection module 260 is configured to favor the selection of an optimized direct stripe write operation over a dual-stage write operation when the following condition is met: $s>(n-k)/2$ (denoted condition (1)). In other words, the stripe write mode selection module 260 is configured to favor the selection of an optimized direct stripe write operation over a dual-stage write operation when the number of strips s needed for the write is greater than one-half the number of parity strips. Otherwise, if the condition is not met, a dual-stage write operation is favored. The condition (1) $s>(n-k)/2$ is based at least in part on experimental and empirical data and analysis which has demonstrated that such condition allows for reducing an amount of network traffic needed for I/O write operations, and reducing an amount and/or cost of writes to, e.g., SSDs, under certain system configurations (e.g., 3 mirrored write caches with write caches on SSDs and one copy local to storage controller performing the writes (e.g., for dual-parity RAID resiliency, the SSDs support write zeros offload, etc.).

Furthermore, in some embodiments, the stripe write mode selection module 260 is configured to favor the selection of a standard direct stripe write operation (e.g., large write) over an optimized direct stripe write operation under certain conditions. As noted above, the condition $s>(n-k)/2$ is utilized to determine in which cases it is better to perform an optimized direct stripe write operation which involves directly writing the I/O data to a first stripe (e.g., interim stripe), followed by performing copy-offload to write the I/O data to a second stripe. Under certain conditions, it preferable to skip the second step (copy-offload operations) and perform only the direct RAID write to target stripe. The purpose of the second step purpose is to efficiently complement the partial stripe write with more data and avoid the more expensive procedure of standard garbage collection. However, if the written data comprises the entire stripe, there will be little or no benefit from moving the data to a new stripe, especially when there is no room for adding more data to the new stripe.

The cost of performing the standard direct stripe write operation can be examined with regard to the cost per byte for freeing stripes. The optimized direct stripe write operation will free the stripe size minus the size of the write. The alternative is to select another stripe in the system, potentially the least full stripe, and perform garbage collection to free it. The following two assumptions are made. First, the amount of amount of valid data in the best stripe for garbage collect is denoted v [strips], wherein the freed capacity is k−v. Second, the amount of freed capacity when rewriting the partial stripe is k−s.

In some embodiments, the following conditions are utilized by the stripe write mode selection module 260 to determine when to favor selection of an optimized direct stripe write operation over a standard direct stripe write operation (e.g., large write):

(2) Writes condition (e.g., SSD writes): assuming that both approaches have a same SSD write cost per capacity, a first condition is based on an amount of freeable capacity: v>s.

(3) Network traffic condition:

$$\frac{k + v * \left(\frac{n}{k}\right)}{k - v} > \frac{\left(s * \left(\frac{n}{k}\right) - s\right)}{k - s}$$

In some exemplary embodiments, based on the above conditions (2) and (3), the stripe write mode selection module 260 is configured to favor the selection of an optimized direct stripe write operation over a standard direct stripe write operation when v>s. Indeed, if the system is very empty, v tends to be smaller and, thus, garbage collection is deemed cheap and the standard direct stripe write operation is favored over the optimized direct stripe write operation.

On the other hand, if v<s, the network condition (3) is measured. If the network condition is met, the stripe write mode selection module 260 is configured to favor the selection of an optimized direct stripe write operation over a standard direct stripe write operation. It is to be noted that for specific implementation of a storage system, other modifiers may apply. For example, updating metadata may be cheaper for the optimized direct stripe write operation due to the temporal locality of relocating this data.

Figure 6:
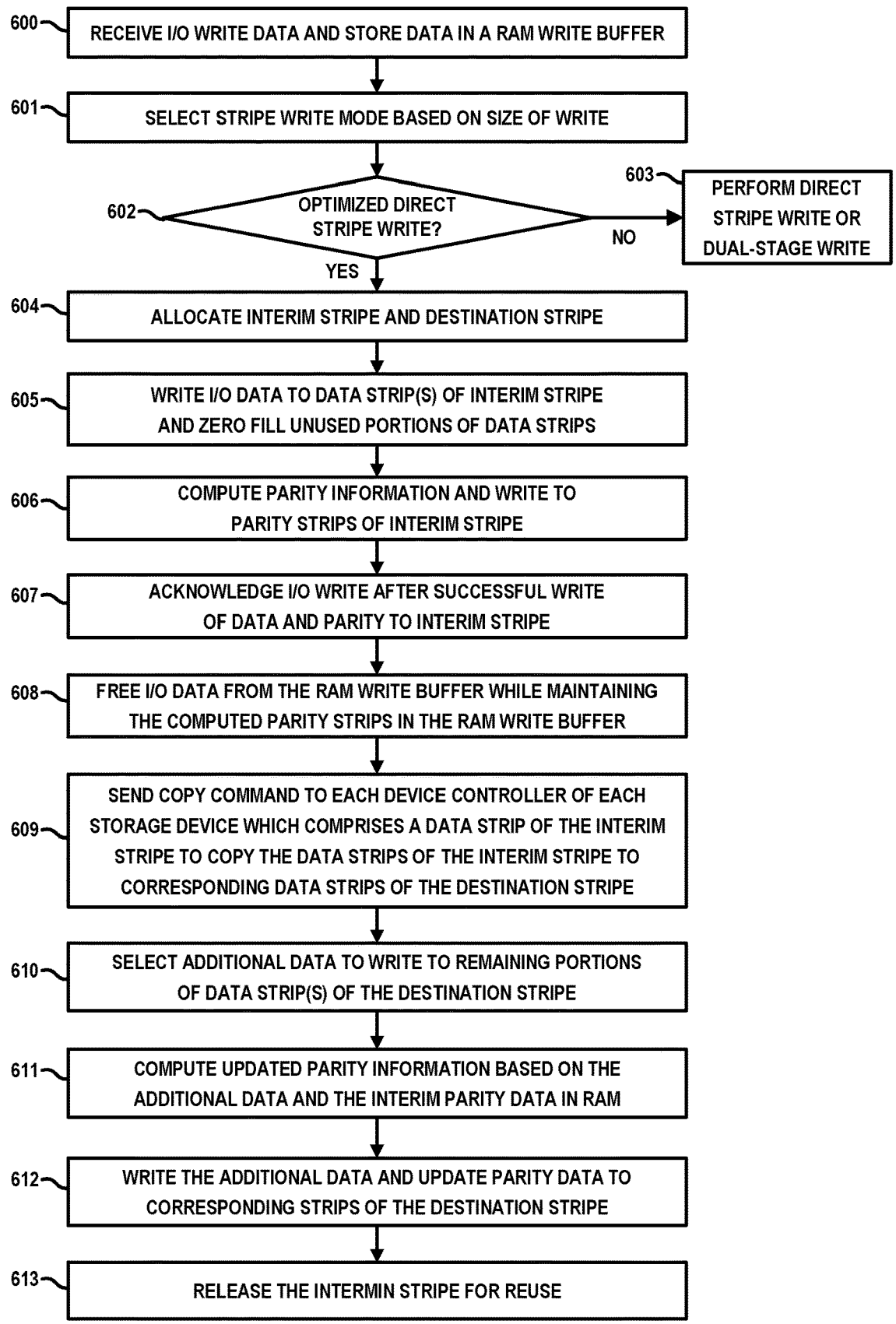
FIG. 6 illustrates a flow diagram of a method for writing stripes to a striped storage volume, according to an exemplary embodiment of the disclosure.

FIG. 6 illustrates a flow diagram of a method for writing stripes to a striped storage volume, according to an exemplary embodiment of the disclosure. For purposes of illustration, the process flow of FIG. 6 will be discussed in the context of the exemplary embodiments shown in FIGS. 1 and 5, wherein it is assumed that a given storage control node (e.g., storage control node 140-1) has received I/O write data to be written to a striped storage volume. The storage control node receives I/O write data and temporarily stores the write data in a write buffer that is maintained in the system RAM (block 600). The RAM write buffer temporarily stores incoming I/O write data to enable controlled writes to a stripe or a write cache, depending on the stripe write operation that is selected. The storage control node will determine and select one of a plurality of stripe write operations based at least on the size the received write data (block 601). In some embodiments, with a compression-enabled storage system that implements inline data compression, the I/O write data can be stored in compressed form. In such instance, the write size is based on the compressed size of the I/O write data, if the I/O write data is compressed.

More specifically, as noted above, in some embodiments, the selectable stripe write modes include a dual-stage write mode, a direct stripe write mode, and an optimized direct stripe write mode. In some embodiments, the determination of whether to select a dual-stage write mode or an optimized direct stripe write mode is based on the above noted condition (1), wherein the stripe write mode selection module 260 is configured to favor the selection of an optimized direct stripe write operation over a dual-stage write operation when the number of strips s needed for the write is greater than one-half the number of parity strips. For a RAID 6 configuration as shown in FIG. 5, assuming two parity strips, an optimized direct stripe write operation is considered when the number of data strips needed for the write data (e.g., as compressed) is greater than 1. Further, if the size of the write data (e.g., as compressed) is substantially equal to, or equal to, or greater than the total size of the data strips, then a standard direct stripe write operation is selected. In some embodiments, the above-noted conditions (2) and (3) can be utilized to select a direct stripe write operation or an optimized direct stripe write operation.

If the optimized direct stripe write mode is not selected for writing the received I/O write data (negative result in block 602), the storage control node will proceed with either the direct stripe write operation (for a relatively large write), or with a dual-stage write operation (for a relatively small write) wherein the I/O write data is initially stored in a write cache (block 603). On the other hand, if the optimized direct stripe write mode is selected (affirmative result in block 602), the storage control node proceeds to allocate two stripes, e.g., an interim stripe and a destination stripe, to implement the optimized direct stripe write operation (block 604). As noted above, the interim stripe comprises a temporary stripe to which the I/O write data is initially written, and the destination stripe comprises a target stripe to which the I/O write data and additional data will be written. As further noted above, in some embodiments, the strip-to-device allocation of both stripes is the same. In other embodiments, the strip-to-device allocation can be relaxed to require the same strip-to-device allocation only for the data strips which are written to the interim stripe. In some embodiments, the interim stripe is initially allocated, while the destination stripe is subsequently allocated when it is needed.

The I/O write data (compressed or uncompressed) is written to data strips of the interim stripe, and the unused data strips or unused portions of a partially written data strip are filled with zeros (block 605). For example, in the illustrative embodiment shown in FIG. 5, the write data consumes only a portion (e.g., first two data strips 500-1 and 500-2) of the interim stripe 500, while the unused portions (e.g., data strips 500-3 and 500-4) of the interim stripe 500 are zero filled. In some embodiments where the storage devices comprise SSDs, an SSD zero write optimization command can be utilized for zero-filling the unused portions of the data strips of the interim stripe. In addition, the storage control node computes parity information based on the data written to the interim data strips, and writes the parity information to one or more parity strips of the interim stripe (block 606). In this process, the parity computations are performed using the I/O write data which is present in the RAM write buffer with the knowledge that the unused portions of the interim stripe are filled with logic zeros.

Once the interim data strips and interim parity strips are successfully written to the interim stripe in the stripes storage volume (e.g., the write operations of blocks 605 and 606 are completed successfully), the storage control node will send an acknowledgment message to the host system or user which issued the I/O write request (block 607). In some embodiments, the data strips in the RAM write buffer (which are written to the interim stripe) are freed from the RAM write buffer, while the computed parity strips are maintained in RAM (block 608). The computed parity strips of the interim stripe are maintained in RAM for purposes of performing a subsequent garbage collection process (blocks 609 through 613) in which the data strips of the interim stripe are copied to the destination stripe, additional data is written to the remaining portions of the data strips of the destination stripe, and updated parity information is written to one or more parity strips of the destination stripe. As explained in further detail blow, the interim parity strips are maintained in RAM for purposes of computing updated parity information for the destination stripe, thereby eliminating the need to perform I/O read operations to read the parity strips of the interim stripe.

At a given point in time, a "garbage collection process" is performed on the interim stripe. More specifically, the storage control node system will send a copy command to each device controller (e.g., SSD controller) of each storage node having a storage device that stores a data strip of the interim stripe to cause the data strips of the interim stripe to be copied to corresponding data strips of the destination stripe (block 609). In response to receiving a copy command, a give device controller will copy the entire data strip of the interim stripe to a target data strip of the destination stripe which resides on the same storage device. As noted above, the copy command can be implemented using protocols including, but not limited to, an XCOPY command, or a "simple copy" command (NVMe specification) which allows, e.g., an SSD controller to copy multiple contiguous ranges to a single destination. With the copy-offload process, each interim data strip is copied to the offset of a respective target strip of the destination stripe, thereby eliminating the need of the storage control node to perform I/O write operations over the storage network to read the interim data strips, and then write the interim data strips to target data strips of the destination stripe (as would be done in a conventional garbage collection process in which data of "victim stripe" would be read, and then written to a new stripe).

The storage control node will then select and prepare additional data to be written to the remaining unused portions of the data strips of the destination stripe (block 610). The additional data can be, e.g., I/O write data which is current present in the RAM write buffer, I/O write data which is current present in a persistent write cache, valid data blocks of victim stripes that are in the process of being garbage collected, etc.

The storage control node will compute parity information for the destination stripe. For example, in some embodiments, the parity data for the destination stripe is computed by updating the parity data of the interim stripe based on the additional data to be written to the destination stripe, and the parity data of the interim stripe which is present in the system RAM (block 611). The parity update process is performed with the knowledge the unused portions of the interim stripe (e.g., unused interim data strip(s) and/or unused portion of an interim data strip) are zero-filled, which eliminates the need to perform I/O read operations to read such unused portions of the interim stripe for purposes of computing updated parity information. In this regard, the updated parity information can be computed by, e.g., XORing the new additional data with the parity information of the interim stripe (currently present in the system RAM) to thereby generate the updated parity information for the destination stripe.

The storage control node will write the new additional data and updated parity data to corresponding data and parity strips of the destination stripe (block 612). Once the data and parity strips of the destination stripe are successfully written to the target storage devices of the striped storage volume, the interim stripe is released for reuse (block 613).

Figure 7:
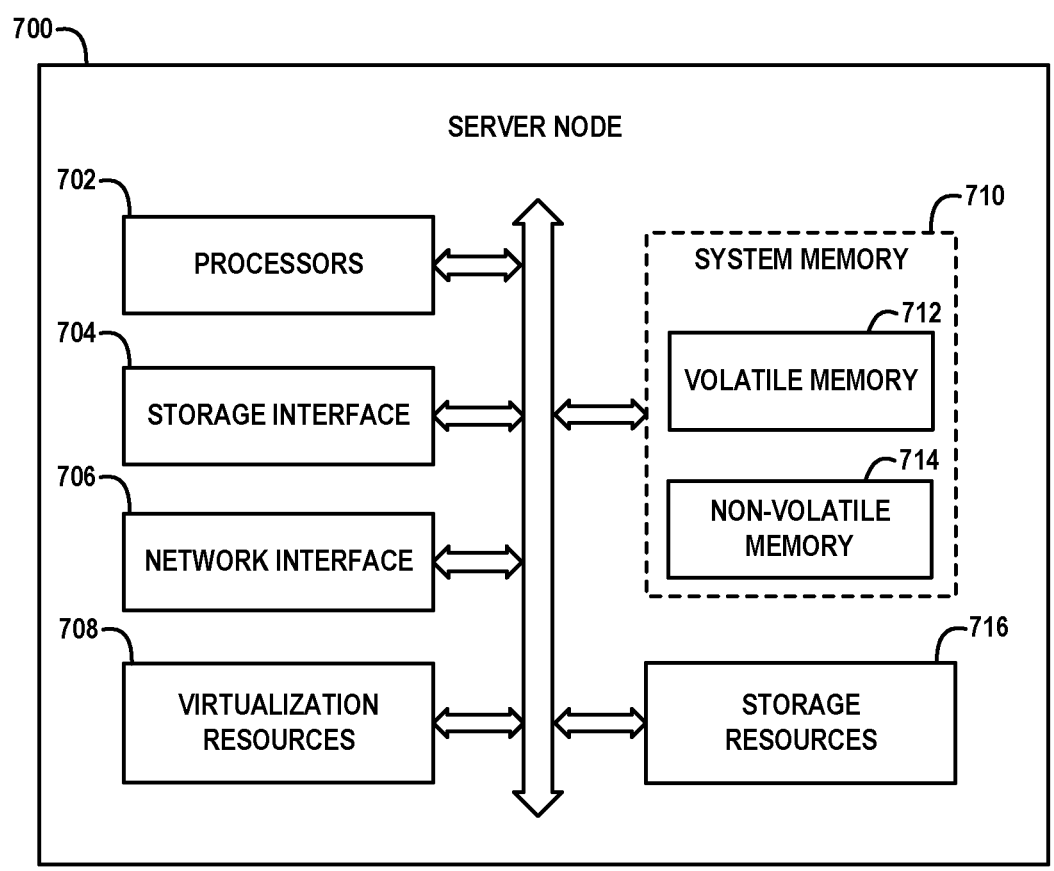
FIG. 7 schematically illustrates a framework of a server for hosting a storage control node, according to an exemplary embodiment of the disclosure.

FIG. 7 schematically illustrates a framework of a server node 700 for hosting a storage control node, according to an exemplary embodiment of the disclosure. The server node 700 comprises processors 702, storage interface circuitry 704, network interface circuitry 706, virtualization resources 708, system memory 710, and storage resources 716. The system memory 710 comprises volatile memory 712 and non-volatile memory 714. The processors 702 comprise one or more types of hardware processors that are configured to process program instructions and data to execute a native operating system (OS) and applications that run on the server node 700.

For example, the processors 702 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 704 enables the processors 702 to interface and communicate with the system memory 710, the storage resources 716, and other local storage and off-infrastructure storage media, using one or more standard communication and/or storage control protocols to read data from or write data to volatile and non-volatile memory/storage devices. Such protocols include, but are not limited to, NVMe, PCIe, PATA, SATA, SAS, Fibre Channel, etc. The network interface circuitry 706 enables the server node 700 to interface and communicate with a network and other system components. The network interface circuitry 706 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 708 can be instantiated to execute one or more services or functions which are hosted by the server node 700. For example, the virtualization resources 708 can be configured to implement the various modules and functionalities of storage control nodes and stripe write control systems as discussed herein. In some embodiments, the virtualization resources 708 comprise virtual machines that are implemented using a hypervisor platform which executes on the server node 700, wherein one or more virtual machines can be instantiated to execute functions of the server node 700. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 700, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In other embodiments, the virtualization resources 708 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 700 as well execute one or more of the various modules and functionalities of a storage control node and a garbage collection control system as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the constituent components and modules of the storage control nodes and stripe write control systems (as shown in FIGS. 1 and 2) and the associated methods for writing stripes to a striped storage volume as discussed herein (e.g., FIGS. 5 and 6) are implemented using program code that is loaded into the system memory 710 (e.g., volatile memory 712), and executed by the processors 702 to perform respective functions as described herein. In this regard, the system memory 710, the storage resources 716, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 710 comprises various types of memory such as volatile RAM, NVRAM, or other types of memory, in any combination. The volatile memory 712 may be a dynamic random-access memory (DRAM) (e.g., DRAM DIMM (Dual In-line Memory Module), or other forms of volatile RAM. The non-volatile memory 714 may comprise one or more of NAND Flash storage devices, SSD devices, or other types of next generation non-volatile memory (NGNVM) devices. The system memory 710 can be implemented using a hierarchical memory tier structure wherein the volatile memory 712 is configured as the highest-level memory tier, and the non-volatile memory 714 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 702 to execute a native operating system and one or more applications or processes hosted by the server node 700, and to temporarily store data that is utilized and/or generated by the native OS and application programs and processes running on the server node 700. The storage resources 716 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:
1. A method, comprising:
performing a stripe write process in a data storage system, wherein the data storage system comprises a storage control node and a plurality of storage nodes, wherein the storage nodes are configured to implement a striped volume comprising a plurality of stripes having strips that are distributed over the plurality of storage nodes, wherein the stripe write process comprises:
receiving, by the storage control node, data from a host system to be written to the striped volume;

allocating, by the storage control node, a first stripe and a second stripe in the striped volume;

writing, by the storage control node, the received data to at least one data strip of the first stripe;

computing, by the storage control node, parity data based on the data written to the first stripe, and writing the parity data to at least one parity strip of the first stripe;

sending, by the storage control node, a copy command to a target storage node of the plurality of storage nodes, which comprises the at least one data strip of the first stripe to which the received data was written, to thereby cause the target storage node to copy the at least one data strip to a data strip of the second stripe which resides on the target storage node;

writing, by the storage control node, additional data to the second stripe;

computing, by the storage control node, updated parity data based on the additional data written to the second stripe and the parity data of the first stripe, and writing the updated parity data to at least one parity strip of the second stripe; and releasing, by the storage control node, the first stripe for reuse.

2. The method of claim 1, wherein the striped volume comprises one of a RAID (Redundant Array of Independent Drives) array, and a log-structured RAID array.

3. The method of claim 1, wherein allocating the first stripe and the second stripe in the striped volume comprises allocating two stripes having a same strip-to-device allocation.

4. The method of claim 1, wherein writing additional data to the second stripe comprises writing at least one of (i) data of received input/output (I/O) write requests stored in a write buffer or write cache, and (ii) valid data of at least one other stripe that is being garbage collected, to unused portions of the second stripe.

5. The method of claim 1, further comprising sending, by the storage control node, an acknowledge message to the host system after the data and parity data are successfully written to the first stripe.

6. The method of claim 1, further comprising:
maintaining, by the storage control node, the parity data of the first stripe in system random-access memory; and
wherein the updated parity data for the second stripe is computed using the additional data and the parity data of the first stripe maintained in the system random-access memory.

7. The method of claim 1, wherein performing the stripe write process further comprises:
selecting, by the storage control node, one of a plurality of different types of stripe write operations, based at least on a size of the received data to be written to the striped volume;
wherein the first stripe and a second stripe in the striped volume are allocated in response to selecting a first type of stripe write operation.

8. The method of claim 7, wherein the first type of stripe write operation is selected in response to determining that (i) a number of data strips of a stripe which is needed to write the received data to the stripe is greater than one-half a number of parity strips that are allocated for stripes in the striped volume, and (ii) the size of the received data to be written to the stripe will not fill the data strips of the stripe.

9. The method of claim 8, further comprising:
selecting, by the storage control node, second type of stripe write operation in which the received data is directly written to a given stripe, in response to determining that the size of the received data to be written to the given stripe is substantially equal to or greater than a total size of the data strips of given stripe; and
selecting, by the storage control node, a third type of stripe write operation in which the received data is initially written to a write cache before being written to a stripe in the striped volume, in response to determining that that a number of data strips of a stripe which is needed to write the received data to the stripe is not greater than one-half a number of parity strips that are allocated for stripes in the striped volume.

10. An article of manufacture comprising a non-transitory processor-readable storage medium having stored therein program code of one or more software programs, wherein the program code is executable by one or more processors to implement a method which comprises:
performing a stripe write process in a data storage system, wherein the data storage system comprises a storage control node and a plurality of storage nodes, wherein the storage nodes are configured to implement a striped volume comprising a plurality of stripes having strips that are distributed over the plurality of storage nodes, wherein the stripe write process comprises:
receiving, by the storage control node, data from a host system to be written to the striped volume;
allocating, by the storage control node, a first stripe and a second stripe in the striped volume;
writing, by the storage control node, the received data to at least one data strip of the first stripe;
computing, by the storage control node, parity data based on the data written to the first stripe, and writing the parity data to at least one parity strip of the first stripe;
sending, by the storage control node, a copy command to a target storage node of the plurality of storage nodes, which comprises the at least one data strip of the first stripe to which the received data was written, to thereby cause the target storage node to copy the at least one data strip to a data strip of the second stripe which resides on the target storage node;
writing, by the storage control node, additional data to the second stripe;
computing, by the storage control node, updated parity data based on the additional data written to the second stripe and the parity data of the first stripe, and writing the updated parity data to at least one parity strip of the second stripe; and
releasing, by the storage control node, the first stripe for reuse.

11. The article of manufacture of claim 10, wherein the program code for allocating the first stripe and the second stripe in the striped volume comprises program code for allocating two stripes having a same strip-to-device allocation.

12. The article of manufacture of claim 10, wherein the program code for writing additional data to the second stripe comprises program code for writing at least one of (i) data of received input/output (I/O) write requests stored in a write buffer or write cache, and (ii) valid data of at least one other stripe that is being garbage collected, to unused portions of the second stripe.

13. The article of manufacture of claim 10, further comprising program code which is executable by the one or more processors to implement a method which comprises:
maintaining, by the storage control node, the parity data of the first stripe in system random-access memory; and wherein the updated parity data for the second stripe is computed using the additional data and the parity data of the first stripe maintained in the system random-access memory.

14. The article of manufacture of claim 10, wherein the program code for performing the stripe write process further comprises program code which is executable by the one or more processors to implement a method which comprises:
selecting, by the storage control node, one of a plurality of different types of stripe write operations, based at least on a size of the received data to be written to the striped volume;
wherein the first stripe and a second stripe in the striped volume are allocated in response to selecting a first type of stripe write operation.

15. The article of manufacture of claim 14, wherein the first type of stripe write operation is selected in response to determining that (i) a number of data strips of a stripe which is needed to write the received data to the stripe is greater than one-half a number of parity strips that are allocated for stripes in the striped volume, and (ii) the size of the received data to be written to the stripe will not fill the data strips of the stripe.

16. The article of manufacture of claim 15, further comprising program code which is executable by the one or more processors to implement a method which comprises:
selecting, by the storage control node, second type of stripe write operation in which the received data is directly written to a given stripe, in response to determining that the size of the received data to be written to the given stripe is substantially equal to or greater than a total size of the data strips of given stripe; and
selecting, by the storage control node, a third type of stripe write operation in which the received data is initially written to a write cache before being written to a stripe in the striped volume, in response to determining that that a number of data strips of a stripe which is needed to write the received data to the stripe is not greater than one-half a number of parity strips that are allocated for stripes in the striped volume.

17. A system, comprising:
a storage control node, and a plurality of storage nodes, wherein the storage nodes are configured to implement a striped volume comprising a plurality of stripes having strips that are distributed over the plurality of storage nodes;
wherein the storage control node is configured to perform stripe write process in which the storage control node is configured to:
receive data from a host system to be written to the striped volume;
allocate a first stripe and a second stripe in the striped volume;
write the received data to at least one data strip of the first stripe;
compute parity data based on the data written to the first stripe, and writing the parity data to at least one parity strip of the first stripe;
send a copy command to a target storage node of the plurality of storage nodes, which comprises the at least one data strip of the first stripe to which the received data was written, to thereby cause the target storage node to copy the at least one data strip to a data strip of the second stripe which resides on the target storage node;
write additional data to the second stripe;
compute updated parity data based on the additional data written to the second stripe and the parity data of the first stripe, and write the updated parity data to at least one parity strip of the second stripe; and
release the first stripe for reuse.

18. The system of claim 17, wherein in allocating the first stripe and the second stripe in the striped volume, the storage control node is configured to allocate two stripes having a same strip-to-device allocation.

19. The system of claim 17, wherein the storage control node is further configured to:
maintain the parity data of the first stripe in system random-access memory; and
compute the updated parity data for the second stripe using the additional data and the parity data of the first stripe maintained in the system random-access memory.

20. The system of claim 17, wherein in performing the stripe write process, the storage control node is further configured to:
select one of a plurality of different types of stripe write operations, based at least on a size of the received data to be written to the striped volume;
wherein the first stripe and a second stripe in the striped volume are allocated in response to selecting a first type of stripe write operation, wherein the first type of stripe write operation is selected in response to determining that (i) a number of data strips of a stripe which is needed to write the received data to the stripe is greater than one-half a number of parity strips that are allocated for stripes in the striped volume, and (ii) the size of the received data to be written to the stripe will not fill the data strips of the stripe;
select a second type of stripe write operation in which the received data is directly written to a given stripe, in response to determining that the size of the received data to be written to the given stripe is substantially equal to or greater than a total size of the data strips of given stripe; and
select a third type of stripe write operation in which the received data is initially written to a write cache before being written to a stripe in the striped volume, in response to determining that that a number of data strips of a stripe which is needed to write the received data to the stripe is not greater than one-half a number of parity strips that are allocated for stripes in the striped volume.

* * * * *